(12) United States Patent
Lafrance et al.

(10) Patent No.: US 6,378,886 B1
(45) Date of Patent: Apr. 30, 2002

(54) ADJUSTABLE ANTI-THEFT DEVICE FOR A FOLDING WHEELCHAIR

(76) Inventors: Robert J. Lafrance, 28 Columbus Ave., Southbridge, MA (US) 01550; Reynie S. Caron, 3 W. Brookfield Rd., North Brookfield, MA (US) 01535

( * ) Notice: Subject to any disclaimer, the term of this patent is extended or adjusted under 35 U.S.C. 154(b) by 0 days.

(21) Appl. No.: 09/306,536

(22) Filed: May 6, 1999

(51) Int. Cl.[7] ................................................. B62B 7/06
(52) U.S. Cl. .................................... 280/304.1; 280/649
(58) Field of Search ............................... 70/261, 94, 14; 280/304.1, 250.1, 42, 39, 649, 647; 297/45, DIG. 4; D12/131, 133

(56) References Cited

U.S. PATENT DOCUMENTS

| | | | | |
|---|---|---|---|---|
| 3,968,991 A | * | 7/1976 | Maclaren | 280/250.1 |
| 4,065,166 A | * | 12/1977 | Shoemaker | 296/23 G |
| 5,020,816 A | * | 6/1991 | Mulholland | 280/250.1 |
| 5,038,667 A | * | 8/1991 | Slater | 70/199 |
| 5,149,120 A | | 9/1992 | Halliday | |

FOREIGN PATENT DOCUMENTS

| | | | | |
|---|---|---|---|---|
| DE | 3725649 | * | 9/1988 | |
| GB | 2213437 | * | 8/1989 | |
| SU | 1012905 | * | 4/1983 | 280/250.1 |

* cited by examiner

*Primary Examiner*—Avraham H. Lerner
(74) *Attorney, Agent, or Firm*—Thomas E. Workman, Jr.

(57) ABSTRACT

A locking anti-theft device operates between any paired collapsedly opposed members of a folding wheelchair to selectively prevent folding. Each end of the anti-theft device is attached, either permanently or removably, to any paired collapsedly opposed members of the wheelchair such that when the device is in the locked position the central pivot point, about which the left and right portion of the device are pivotally attached, is restricted from pivoting thus preventing the wheelchair from folding.

16 Claims, 4 Drawing Sheets

ADJUSTABLE ANTI-THEFT DEVICE FOR A FOLDING WHEELCHAIR

FIELD OF THE INVENTION

The invention relates to an adjustable anti-theft device for use primarily with wheelchairs of the folding variety, however, this adjustable anti-theft device may be suitable for use with other types of folding apparatuses as well.

BACKGROUND OF THE INVENTION

Wheelchairs are relatively expensive devices costing thousands of dollars in some cases. They generally come in two varieties—folding and non-folding types. The folding variety is susceptible to an increasing amount of theft because of their high value and the ease with which some can be folded, stored and carried off. As one might expect, the incidence of theft of non-folding wheelchairs is substantially less.

Many hospitals, nursing homes, rest homes and similar facilities are experiencing ever increasing costs due to the loss of folding wheelchairs. Most wheelchairs utilized in the aforementioned facilities are of a conventional folding type. Consequently, these wheelchairs are capable of being easily folded and inadvertently carried off by patients' family or deliberately stolen by folding them and putting them in the trunk of a car.

The prior art, U.S. Pat. No. 5,149,120, also discloses a locking mechanism which may be designed into the wheelchair at the time of manufacture or which may be added later as in the present invention. However, said prior art prohibits a folding wheelchair from being folded by restricting a pair of centrally pivoted cross braces under the wheelchair seat which move from an X-shaped configuration to a more parallel configuration when the wheelchair is being folded. This mechanism is difficult to reach and to operate and particularly presents a problem when the wheelchair user is unassisted in the locking and securing the anti-theft device.

By being able to selectively restrict a folding wheelchair from folding, some of the aforementioned theft could be avoided. Consequently, there is a market demand for an inexpensive anti-theft device that can be designed into newly manufactured wheelchairs or, alternatively, easily fitted to existing folding wheelchairs which selectively prohibits them from folding when they are used and allows them to be folded and stored when they are not being used.

Therefore, the several objects of the present invention are to provide an improved wheelchair with an anti-theft device, the location of which is easily accessible making for easy locking and unlocking. It is another object of the invention to provide an easily accessible anti-theft device for use with wheelchairs and other folding apparatuses. It is another object of the invention to permit usability on many types of folding wheelchairs, not just those types that have an X-shaped folding cross-member configuration as in the prior art. It is another object of the invention to permit alternative placement of the anti-theft device, both in the front and at the rear of the folding wheelchair or between many of the pairs of vertical or horizontal collapsedly opposed structural members of the wheelchair. Furthermore, it is an object of the present invention to provide a low cost solution to a high cost problem.

SUMMARY OF THE INVENTION

The present invention is an anti-theft device primarily for use with a folding wheelchair operated by selectively preventing folding of the wheelchair when the anti-theft device is engaged. This is accomplished by preventing from folding, any pair of collapsedly opposing members comprising a portion of the chassis of the folding wheelchair that collapse toward one another when the wheelchair is being folded.

A left member and a right member of the anti-theft device are pivotally attached to said pair of collapsedly opposing members of the folding wheelchair by an attachment means. Said left and right members overlap and are pivotally connected to one another by a pivotal attachment means. A locking mechanism selectively prevents the left and right members from pivoting relative to one another about the pivotal attachment means, thus preventing the wheelchair from folding.

BRIEF DESCRIPTION OF THE DRAWINGS

The foregoing and other objects of this invention, the various features thereof, as well as the invention itself, may be more fully understood from the following description, when read together with the accompanying drawings, described.

For the most part, and as will be apparent when referring to the figures, when an item is used unchanged in more than one figure, it is identified by the same alphanumeric reference indicator in all figures.

DETAILED DESCRIPTION OF THE PREFERRED EMBODIMENTS

Figure 1:
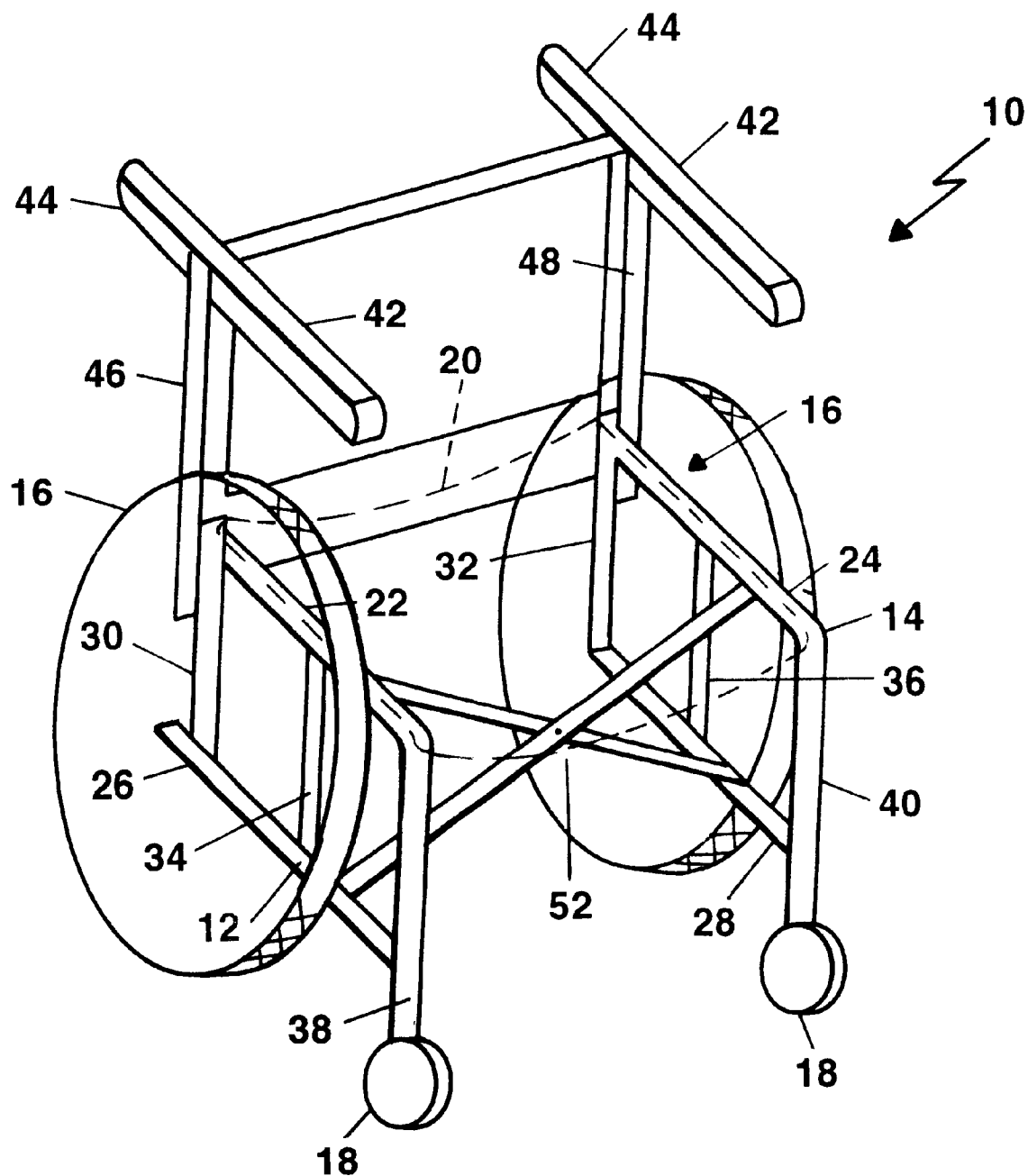
FIG. 1 is a partial perspective view illustrating a collapsible wheelchair of a type to which the anti-theft device of the present invention may be applied.

FIG. 1 illustrates a collapsible apparatus, namely, a wheelchair of the general type to which the anti-theft device in accordance with the present invention may be applied.

As shown in FIG. 1, the wheelchair frame, referred to generally by the reference numeral 10, includes tubular members adapted for folding and unfolding movement to transition between an expanded configuration for normal wheelchair use and a collapsed configuration for facilitated transport and/or storage.

The general construction of the illustrative wheelchair frame 10 is representative of lightweight folding wheelchair frames formed predominantly from metal tubing members. Those skilled in the art will appreciate that the wheelchair frame of FIG. 1 is only one of many possibilities and the present invention is not meant to be limited by this representation. More particularly, the wheelchair 10 conventionally includes left and right side frames 12 and 14 each of which includes means for supporting a relatively large main rear wheel 16 and a relatively small front caster wheel 18. While the main rear wheels 16 rotate in substantially fixed parallel planes orthogonal (i.e., vertical) to a ground surface upon which the wheelchair moves, each caster wheel 18 is capable of rotating 360 degrees with respect to an axis orthogonal to the ground surface. As a result, the wheelchair is capable of superior maneuverability in tight quarters. The side frames 12 and 14 respectively include horizontally extending upper side rails 22 and 24, horizontally extending lower side rails 26 and 28, vertically extending rear side rails 30 and 32, vertically extending middle side rails 34 and 36, and vertically extending front side rails 38 and 40. A folding seat 20, such as a sling seat of the like, extends between upper side rails 22 and 24. Arm rests 42 and push handles 44 are normally provided at or near the upper end of the seat-back posts 46 and 48, all in a well-known manner to one skilled in the art. A cross brace unit 52 is connected between the side frames 12 and 14 to provide a movable support structure accommodating folding movement of the side frames between the expanded and collapsed positions.

The aforementioned left and right side frames 12 and 14, including upper side rails 22 and 24, lower side rails 26 and 28, rear side rails 30 and 32, middle side rails 34 and 36, front side rails 38 and 40, and seat back posts 46 and 48 are of the type which may be considered as collapsedly opposing.

An exploded view of a preferred embodiment of the adjustable anti-theft device 54 the present invention is shown in FIG. 2 and includes a left member 56, a night member 58 and a locking mechanism 60. The adjustable anti-theft device 54 shown in FIG. 2 is not attached to a wheelchair, but may be either integral with the frame (e.g., incorporated at the production stage) or attachable and removable to any one of a number of wheelchairs. As illustrated in detail in FIGS. 2, 3, and 4, the left member 56 and right member 58 of the anti-theft device are pivotally attached via a first tubular grip 67 and a second grip 68 to a pair of collapsedly opposing members 32 and 30; etc. of the wheelchair. By way of illustration and not limitation the first and second tubular grips may take the form of pivotable circular clamps. Such attachments may be made to numerous placements on pairs of collapsedly opposing members, however, optimal placement may be attained when left member 56 and right member 58 are pivotally attached to rear side rails 30 and 32 for ease of access when locking and unlocking the anti-theft device. It should be understood that there are numerous possible placements for anti-theft device 54 and this detailed description does not attempt to demonstrate or include all possible placements.

Figure 3:
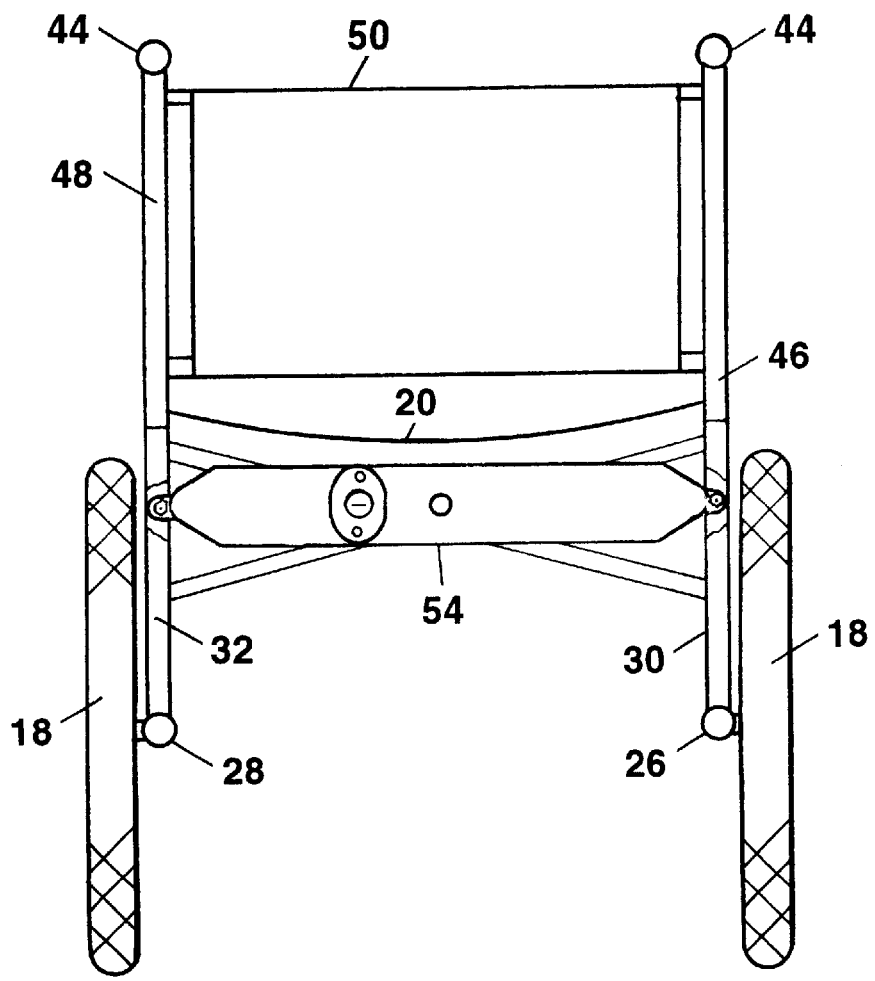
FIG. 3 is a front view of the anti-theft device shown in FIG. 2 as applied to two collapsedly opposing members of the folding wheelchair of FIG. 1.

FIG. 3 shows the preferred embodiment of anti-theft device 54, shown attached to a pair of vertically opposed members 30 and 32. Anti-theft device 54 can alternatively be attached to other such collapsedly opposed members, including horizontally opposed members such as 26 and 28.

Figure 4A:
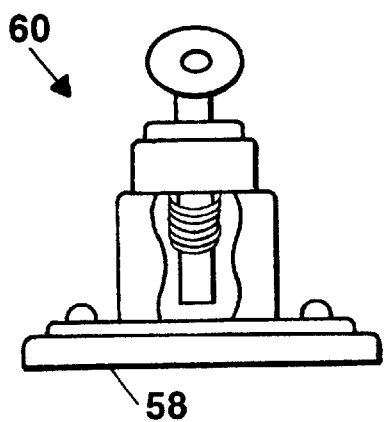
FIG. 4 is the side view of a type of locking mechanism of the anti-theft device shown in FIG. 2.
Figure 4B:
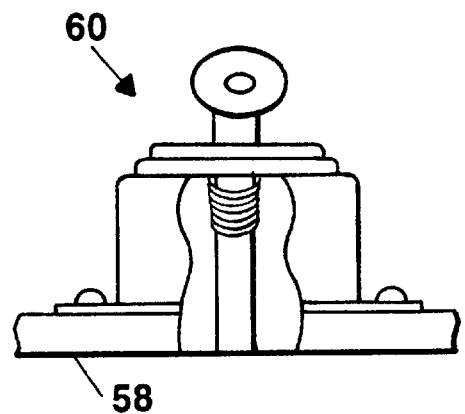

In more detail, said left portion 56 and said right portion 58 are constructed of a durable material such as solid aluminum. Said left portion 56 contains multiple horizontal slots 62 spatially placed for size adjustment to fit between the paired collapsible members of the wheelchair, said slot placement being dependent on the design of the particular wheelchair. Said left portion 56 and right portion 58 overlap and are pivotally connected by an attachment means 64. The locking means 60 of the anti-theft device 54 is of the type that may be permanently affixed to the body of the right portion 58, the body of the left portion 56, or may be of a stand alone type. The locking means 60 is of the type that prevents the left portion 56 and right portion 58 from pivoting relative to one another about the pivotally connecting attachment means 64. FIGS. 2, 3, and 4 show the use of a standard pushpin type of lock 60 (e.g., a gun cabinet lock) in the preferred embodiment. When locking mechanism 60 is engaged as shown in FIG. 4b, left portion 56 and right portion 58 are prevented from pivoting relative to one another about attachment means 64, thus preventing the wheelchair from folding. When the locking means 60 is disengaged, as shown in FIG. 4a, the left portion 56 and right portion 58 are collapsible such that the left portion 56 and right portion 58 pivot about hinge pin 64, and in accordance with pivot lip 66, induce the left portion 56 and right portion 58 to rotate about the pivotally connecting attachment means in an inverted "V" configuration.

The invention may be embodied in other specific forms without departing from the spirit or central characteristics thereof. As various changes could be made in the above constructions without departing from the scope of the present invention, it should be understood that all matter contained in the above description or shown in the accompanying drawings shall be interpreted as illustrative and not in a limiting sense. The present embodiments are, therefore, to be considered in all respects as illustrative and not restrictive, the scope of the invention being indicated by appending claims rather than by the foregoing description, and all changes that come within the meaning and range of equivalency of the claims are therefore intended to be embraced therein.

Figure 2A:
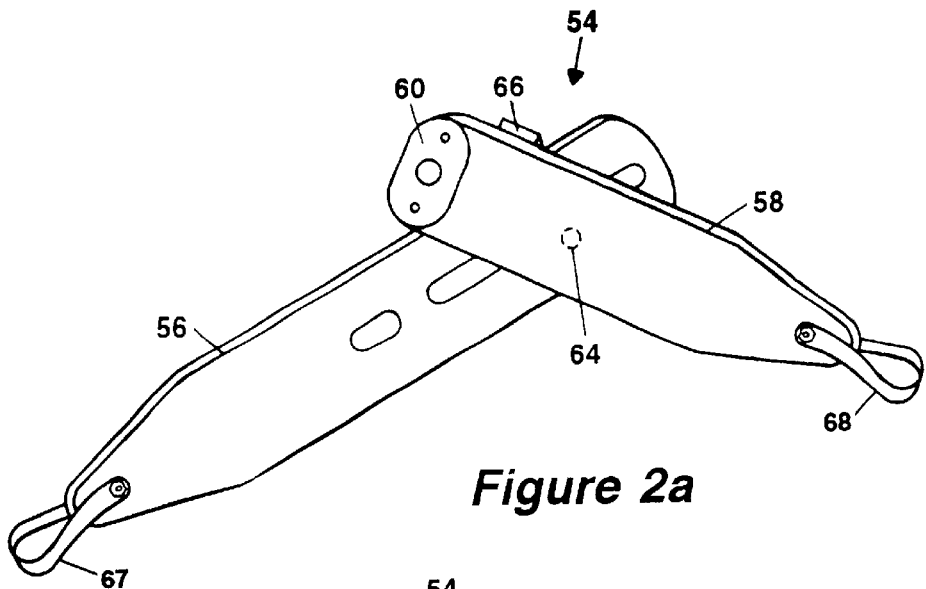
FIG. 2 is a front view of the anti-theft device in accordance with the present invention.
Figure 2B:
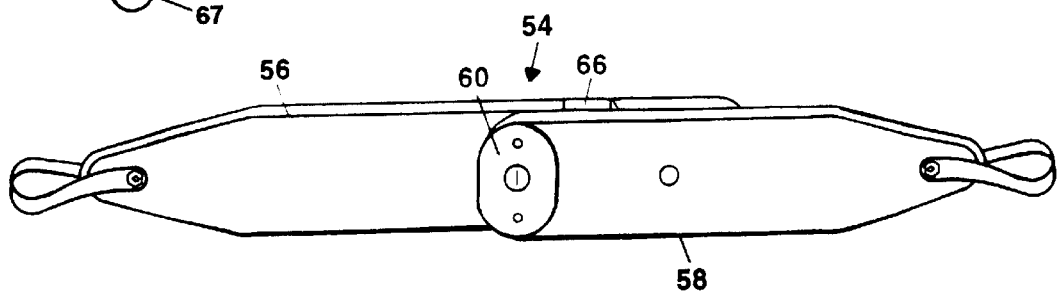
Figure 2C:
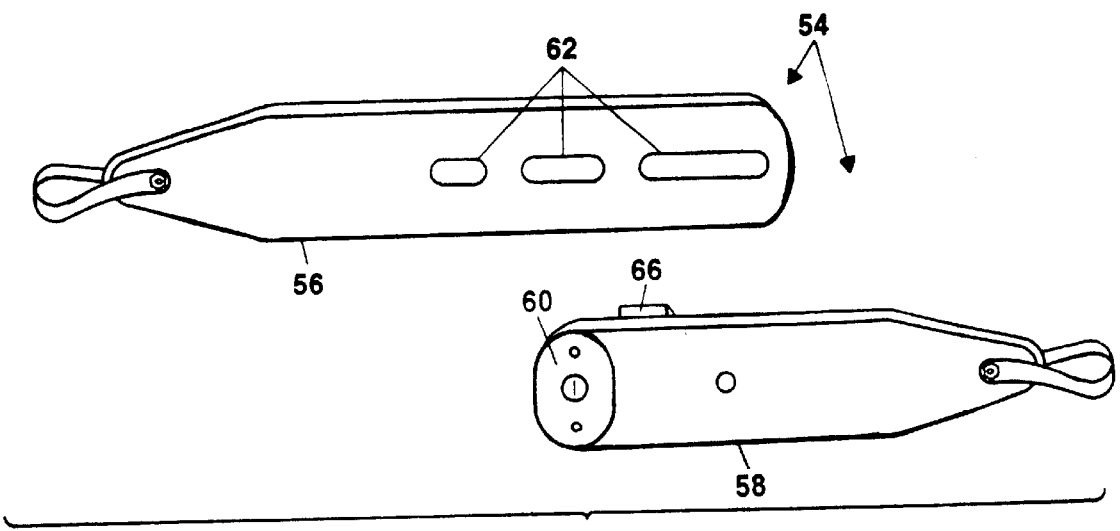
Figure 2D:
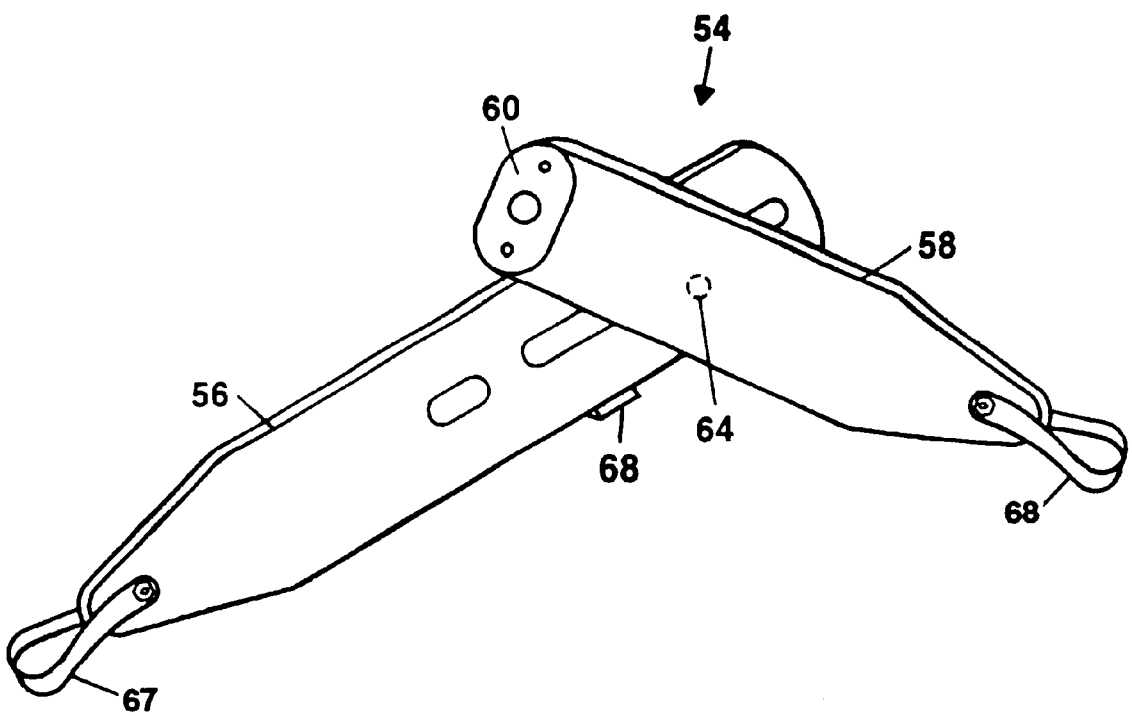

In the preferred embodiment, pivot lip 66 may be affixed to the upper edge of right member 58 such that pivot lip 66 extends across the width of left member 58 and right member 56 to restrict directional folding of the anti-theft device 54 to an upward folding direction as shown in FIG. 2b. Alternatively, pivot lip 66 may be affixed to the lower edge of the left portion 56 such that pivot lip 66 extends across the width of right member 56 and left member 58 to restrict directional folding of the anti-theft device 54 to an upward folding direction. The pivot lip 66 may be strategically placed to restrict the folding to a downward direction or no pivot lip 66 may be used at all.

What is claimed is:

1. An anti-theft device for selectively preventing a collapsible apparatus from folding by attaching said anti-theft device to a first and a second collapsedly opposing members of said collapsible apparatus, said anti-theft device comprising:

A. an elongated first member having a first end and a second end, wherein said first end includes a first pivotal attachment mechanism securable to said first collapsedly opposing member;

B. an elongated second member having a third end and a fourth end, wherein said third end includes a second pivotal attachment mechanism securable to said second collapsedly opposing member;

C. a pivot mechanism connecting said first member to said second member, said pivot member comprising:
    a pivot pin secured to said first member; and
    a slot formed lengthwise in said second member, wherein said pivot pin is adapted to slide within said slot in response to the folding and unfolding of said collapsible apparatus; and D. a locking mechanism integral with the first member, wherein engagement of the locking mechanism fixedly secures said first member to said second member, wherein said first and second members include an adjustment mechanism to accommodate any of a plurality of widths in the gap spanned between the first and second collapsedly opposing members, such that the locking mechanism may be engaged when said collapsible apparatus is unfolded.

2. The anti-theft device as set forth in claim 1 wherein said first member includes a lip that limits the rotation of said first member with respect to said second member about said pivot mechanism to a particular direction.

3. The anti-theft device as set forth in claim 1 wherein said second member includes a lip that limits the rotation of said first member with respect to said second member about said pivot mechanism to a particular direction.

4. The anti-theft device as set forth in claim 1 wherein said locking means is a push pin lock.

5. The anti-theft device as set forth in claim 1 wherein said collapsible apparatus is a wheelchair.

6. The anti-theft device as set forth in claim 1 wherein each of said first and said second attachment mechanism includes a pivotable circular clamp.

7. The anti-theft device as set forth in claim 1 wherein:
said first attachment mechanism includes:
a first tubular grip securable to said first collapsedly opposed member and
said second attachment mechanism includes:
a second tubular grip securable to said second collapsedly opposed member.

8. A lockable wheelchair, including a frame having first and second collapsedly opposing members, said members generally vertically disposed, a seat generally horizontally disposed between said first and second collapsedly disposed members, a backrest, wheels, footrests, hand-grips, and an anti-theft device, said anti-theft device comprising:
A. an elongated first member having a first end and a second end, wherein said first end includes a first pivotal attachment mechanism securable to said first collapsedly opposing member;
B. an elongated second member having a third end and a fourth end, wherein said third end includes a second pivotal attachment mechanism securable to said second collapsedly opposing member;
C. a pivot mechanism connecting said first member to said second member; and a locking mechanism integral with the first member, wherein engagement of the locking mechanism fixedly secures said first member to said second member and wherein said pivot mechanism includes:
1. a pivot pin secured to said first member; and
2. a slot formed lengthwise in said second member, wherein said pivot pin is adapted to slide within said slot in response to the folding and unfolding of said collapsible apparatus; and,
3. an adjustment mechanism to accommodate any of a plurality of widths in the gap spanned between the first and second collapsedly opposing members, such that the locking mechanism may be engaged when said collapsible apparatus is unfolded.

9. The anti-theft device as set forth in claim 8 wherein said first member includes a lip that limits the rotation of said first member with respect to said second member about said pivot mechanism to a particular direction.

10. The anti-theft device as set forth in claim 8 wherein said second member includes a lip that limits the rotation of said first member with respect to said second member about said pivot mechanism to a particular direction.

11. The anti-theft device as set forth in claim 8 wherein said locking means is a push pin lock.

12. The anti-theft device as set forth in claim 8 wherein said collapsible apparatus is a wheelchair.

13. The anti-theft device as set forth in claim 8 wherein each of said first and said second attachment mechanism includes a pivotable circular clamp.

14. The anti-theft device as set forth in claim 8 wherein:
said first attachment mechanism includes:
a first tubular grip securable to said first collapsedly opposed member and
said second attachment mechanism includes:
a second tubular grip securable to said second collapsedly opposed member.

15. An anti-theft device, for selectively preventing a collapsible apparatus from folding by attaching said anti-theft device to a first and a second tubular collapsedly opposing members of said collapsible apparatus, said anti-theft device comprising:
an elongated first member comprising:
a first tubular clamp securable to said first tubular collapsedly opposing member;
a first arm having a first end and a second end, wherein the first end is pivotally attached to said first tubular clamp;
a push pin lock secured proximate to said second end of said first arm; and
a pivot pin having a first pin end and a second pin end, wherein said first pin end is secured to said first arm and the pivot pin extends generally orthogonally from said first arm, and wherein said pivot pin is disposed between said push pin lock and said first end;
an elongated second member comprising:
a second tubular clamp securable to said second tubular collapsedly opposing member,
a second arm having a third end and a fourth end, wherein the third end is pivotally attached to said second tubular clamp;
a plurality of lock openings formed within said second arm proximate to said fourth end and for mated engagement with said push pin lock when said push pin lock is extended, wherein engagement of said lock fixedly secures said first member to said second member such that, when the anti-theft device is installed, the collapsible apparatus cannot be folded;
a pivot slot formed lengthwise in said second arm between said plurality of lock openings and said third end, wherein said second pin end of said pivot pin is slidably seated within said pivot slot and is adapted to slide within said slot in response to the folding and unfolding of said collapsible apparatus.

16. A lockable wheelchair, including a frame having first and second collapsedly opposing members, said members generally vertically disposed, a seat generally horizontally disposed between said first and second tubular collapsedly disposed members, a backrest, wheels, footrests, hand-grips, and an anti-theft device, said anti-theft device comprising:
an elongated first member comprising:
a first tubular clamp securable to said first tubular collapsedly opposing member;
a first arm having a first end and a second end, wherein the first end is pivotally attached to said first tubular clamp;
a push pin lock secured proximate to said second end of said first arm; and
a pivot pin having a first pin end and a second pin end, wherein said first pin end is secured to said first arm and the pivot pin extends generally orthogonally from said first arm, and wherein said pivot pin is disposed between said push pin lock and said first end;

a second tubular clamp securable to said second tubular collapsedly opposing member;

a second arm having a third end and a fourth end, wherein the third end is pivotally attached to said second tubular clamp;

a plurality of lock openings formed within said second arm proximate to said fourth end and for mated engagement with said push pin lock when said push pin lock is extended, wherein engagement of said lock fixedly secures said first member to said second member such that the wheelchair cannot be folded;

a pivot slot formed lengthwise in said second arm between said plurality of lock openings and said third end, wherein said second pin end of said pivot pin is slidably seated within said pivot slot and slides within said slot in response to the folding and unfolding of said collapsible wheelchair.

* * * * *